(12) United States Patent
Ohsaku

(10) Patent No.: US 6,298,293 B1
(45) Date of Patent: Oct. 2, 2001

(54) KINETIC STATE QUANTITY ESTIMATING DEVICE AND METHOD FOR MOTOR VEHICLE

(75) Inventor: Satoru Ohsaku, Toyota (JP)

(73) Assignee: Toyota Jidosha Kabushiki Kaisha, Tokyo (JP)

(*) Notice: Subject to any disclaimer, the term of this patent is extended or adjusted under 35 U.S.C. 154(b) by 0 days.

(21) Appl. No.: 09/541,052

(22) Filed: Mar. 31, 2000

(30) Foreign Application Priority Data

Apr. 6, 1999 (JP) .................................................. 11-098915

(51) Int. Cl.$^7$ .............................. G06G 7/76; B60G 17/00
(52) U.S. Cl. .......................... 701/37; 188/266.1; 701/36; 701/70; 280/840; 280/702; 280/708
(58) Field of Search .................................. 701/37, 38, 48; 280/5.515, 689; 180/197

(56) References Cited

U.S. PATENT DOCUMENTS

| 5,430,646 | * | 7/1995 | Kimura et al. | ............. | 364/424.05 |
| 5,630,623 | * | 5/1997 | Ganzel | ............................. | 280/772 |
| 5,884,921 | * | 3/1999 | Katsuda | ........................... | 280/5.515 |
| 5,911,768 | * | 6/1999 | Sasaki | ............................. | 701/38 |
| 5,935,181 | * | 8/1999 | Iwasaki | ............................. | 701/37 |
| 5,987,367 | * | 11/1999 | Ohsaku et al. | .................. | 701/37 |

FOREIGN PATENT DOCUMENTS

| 5-294122 | 11/1993 | (JP) . |
| 6-344743 | 12/1994 | (JP) . |
| 9-309316 | 12/1997 | (JP) . |

* cited by examiner

*Primary Examiner*—Tan Nguyen
*Assistant Examiner*—Tuan C To
(74) *Attorney, Agent, or Firm*—Oliff & Berridge PLC

(57) ABSTRACT

A speed (Zw'−Zb') and an amount (Zw−Zb) of displacement of a wheel relative to a vehicle body are estimated with the aid of an observer, based on a vertical acceleration Zb" of the vehicle body detected by a sensor. In this observer, a non-linear component fnl(Zw'−Zb', P) of a damping force of a damper is derived from an estimated relative speed y1ob and an opening position P of the damper, and the component fnl(Zw'−Zb', P) is used as a control input. The non-linear component fnl(Zw'−Zb', P) is compensated for by means of a spring force fs of a stabilizer which is generated by roll movements of the vehicle body resulting from a convex-concave road surface, a change ΔMr in road holding load which is calculated based on a lateral acceleration Gy and generated by roll movements of the vehicle body when the vehicle turns, and a change ΔMp in road holding load which is calculated based on a longitudinal acceleration Gx and generated by pitch movements of the vehicle body when the vehicle is accelerated or decelerated.

16 Claims, 8 Drawing Sheets

KINETIC STATE QUANTITY ESTIMATING DEVICE AND METHOD FOR MOTOR VEHICLE

INCORPORATION BY REFERENCE

The disclosure of Japanese Patent Application No. HEI 11-98915 filed on Apr. 6, 1999 including the specification, drawings and abstract is incorporated herein by reference in its entirety.

BACKGROUND OF THE INVENTION

1. Field of Invention

The present invention relates to a kinetic state quantity estimating device and to a kinetic state quantity estimating method which are applied to a vehicle having a damper that generates a damping force corresponding to an orifice opening degree and designed to estimate a vertical kinetic state quantity of a sprung member relative to an unsprung member by means of an observer.

2. Description of Related Art

Relevant devices of this kind are disclosed, for example, in Japanese Patent Applications Laid-Open Nos. HEI 10-913 and HEI 9-309316. In these devices, a vertical acceleration of a sprung member is detected as a vertical kinetic state quantity thereof relative to absolute space. An observer estimates the relative speed of a sprung member by using the detected vertical acceleration as an input variable and a non-linear component of a damping force of a damper determined by an orifice opening degree as a control input. The estimated relative speed is indicative of a vertical kinetic state quantity of the sprung member relative to an unsprung member.

The aforementioned kinetic state quantity estimating devices according to the related art make it possible to precisely estimate a kinetic state quantity of the sprung member relative to the unsprung member at the time of heaving movements of the vehicle. However, a spring force of a stabilizer that influences movements of the sprung member and changes in road holding load resulting from roll and pitch movements of the sprung member are not taken into account in the devices of the related art. Therefore if the sprung member makes roll movements due to disturbance from a road surface, or if the sprung member makes roll movements when the vehicle turns, or if the sprung member makes pitch movements when the vehicle is accelerated or decelerated, the aforementioned relative kinetic state quantity cannot be estimated with high precision.

SUMMARY OF THE INVENTION

The present invention has been made with a view to solving the aforementioned problems. It is an object of the present invention to provide a vehicular kinetic state quantity estimating device and a vehicular kinetic state quantity estimating method which make it possible to precisely estimate a kinetic state quantity of a sprung member relative to an unsprung member even when the sprung member makes roll movements due to disturbance from a road surface, or the sprung member makes roll movements when the vehicle turns, or the sprung member makes pitch movements when the vehicle is accelerated or decelerated.

In order to address the above-stated problem, a kinetic state quantity estimating device according to a first aspect of the present invention comprises an absolute kinetic state quantity detector, an observer and a first compensator. The absolute kinetic state quantity detector detects a vertical kinetic state quantity of the sprung member relative to absolute space. The observer estimates the vertical kinetic state quantity of the sprung member relative to the unsprung member based upon the vertical kinetic state quantity detected by the absolute kinetic state quantity detector and a non-linear component of the damping force of the damper determined by the orifice opening degree as a control input. The first compensator compensates for the control input of the observer based upon a spring force of a stabilizer. The spring force of the stabilizer is determined based upon an amount of displacement of the sprung member relative to the unsprung member. The determined spring force is used to compensate for the control input of the observer. Thus, the observer estimates the vertical kinetic state quantity of the sprung member relative to the unsprung member based on the compensated control input.

According to the first aspect of the present invention, even when the sprung member makes roll movements due to disturbance from a road surface or the like and the spring force of the stabilizer affects the movements of the sprung member, the first compensator compensates for the control input of the observer based upon the spring force of the stabilizer. Therefore a kinetic state quantity of the sprung member relative to the unsprung member can be estimated with high precision.

The first compensator may confine the spring force of the stabilizer to within a predetermined range. In this construction, since the spring force of the stabilizer is inhibited from becoming unsuitably great owing to an error, the value estimated by the observer does not oscillate. Therefore a kinetic state quantity of the sprung member relative to the unsprung member is estimated with high stability.

Furthermore, the first aspect of the present invention may include a lateral acceleration detector that detects a lateral acceleration of the vehicle, and a second compensator. The second compensator determines a change in road holding load generated by roll movements of the sprung member based on the lateral acceleration detected by the lateral acceleration detector and compensates for the control input of the observer based upon the determined change in road holding load. In this construction, even when the sprung member makes roll movements at the time of the turning of the vehicle and the road holding load of the sprung member changes, the second compensator compensates for the control input of the observer based upon the change in road holding load resulting from the roll movements. Therefore a kinetic state quantity of the sprung member relative to the unsprung member can be estimated with high precision.

Furthermore, the first aspect of the present invention may also include a longitudinal acceleration detector that detects a longitudinal acceleration of the vehicle, and a third compensator. The third compensator determines a change in road holding load generated by pitch movements of the sprung member based on the longitudinal acceleration detected by the longitudinal acceleration detector and compensates for the control input of the observer based upon the determined change in road holding load. In this construction, even when the sprung member makes pitch movements at the time of acceleration or deceleration of the vehicle and the road holding load of the sprung member changes, the third compensator compensates for the control input of the observer based upon the change in road holding load resulting from the pitch movements. Therefore a kinetic state quantity of the sprung member relative to the unsprung member can be estimated with high precision.

A kinetic state quantity estimating method of the present invention detects a vertical kinetic state quantity of the sprung member relative to absolute space, inputs the vertical kinetic state quantity detected by the absolute kinetic state quantity detector into an observer that estimates the vertical kinetic state quantity of the sprung member relative to the unsprung member using the input detected vertical kinetic state quantity and a non-linear component of the damping force of the damper determined by the orifice opening degree as a control input. The method also uses an amount of displacement of the sprung member relative to the unsprung member to determine a spring force of a stabilizer, and compensates for the control input of the observer based upon the determined spring force. In this mode of implementation, even when the sprung member makes roll movements due to disturbance from a road surface or the like and the spring force of the stabilizer affects the movements of the sprung member, the control input of the observer is compensated for based upon the spring force of the stabilizer. Therefore a kinetic state quantity of the sprung member relative to the unsprung member can be estimated with high precision.

Furthermore, a change in road holding load generated by roll or pitch movements of the sprung member can be determined based on a lateral or longitudinal acceleration, and the control input of the observer is compensated for based upon the determined change in road holding load. In this mode of implementation, even when the sprung member makes roll or pitch movements at the time of the turning of the vehicle and the road holding load of the sprung member changes, the control input of the observer is compensated for based upon the change in road holding load resulting from the roll or pitch movements. Therefore a kinetic state quantity of the sprung member relative to the unsprung member can be estimated with high precision.

It is to be noted in the present specification that the absolute vertical kinetic state quantity of the sprung member refers to a vertical acceleration, a vertical speed, an amount of vertical displacement or the like of the sprung member relative to absolute space, and that the vertical kinetic state quantity of the sprung member relative to the unsprung member refers to a vertical acceleration, a vertical speed, an amount of vertical displacement or the like of the sprung member relative to the unsprung member.

BRIEF DESCRIPTION OF THE DRAWINGS

The foregoing and further objects, features and advantages of the present invention will become apparent from the following description of a preferred embodiment with reference to the accompanying drawings, wherein.

DETAILED DESCRIPTION OF PREFERRED EMBODIMENTS

An embodiment of a vehicular suspension control device to which a kinetic state quantity estimating device according to the present invention is applied will be described hereinafter. The description of a preferred embodiment will be preceded by the explanation of a basic theory of the kinetic state quantity estimating device.

a. Explanation of Basic Theory

Figure 1A:
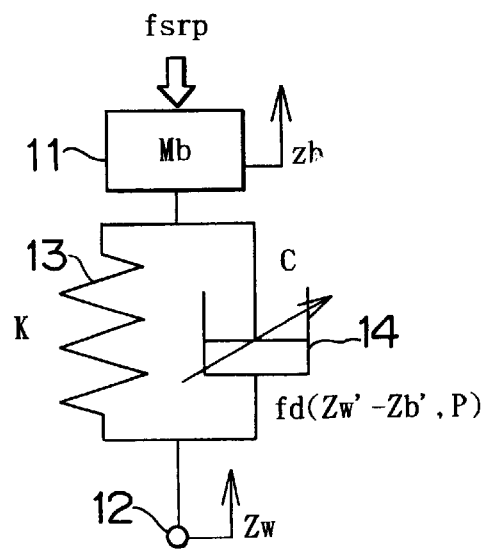
FIG. 1A is a model view with one degree of freedom wherein a single wheel is shown.

FIG. 1A shows a model of a single wheel with one degree of freedom. In FIG. 1A, Zb represents a vertical displacement amount with respect to a reference position of a sprung member (a vehicle body 11) in absolute space, and Zw represents a vertical displacement amount with respect to a reference position of an unsprung member (a wheel 12) in absolute space. The displacement amounts Zb and Zw assume positive values when the sprung member and the unsprung member are displaced upward. K represents a spring constant of a spring 13 that is incorporated into a vehicular suspension system and disposed between the vehicle body 11 and the wheel 12. fd(Zw'-Zb', P) represents a damping force of a damper 14 that is incorporated into the vehicular suspension system and disposed between the vehicle body 11 and the wheel 12. This damping force fd(Zw'-Zb', P) is a function determined by a vertical speed (Zw'-Zb') of the wheel 12 relative to the vehicle body 11 and an opening position P of the damper 14, which corresponds to an orifice opening degree having a plurality of stages (sixteen stages in this embodiment). The reference characters Zb' and Zb" used in the present specification represent a vertical speed and a vertical acceleration of the vehicle body 11, respectively, and assume positive values when the vehicle body 11 moves upward in absolute space. Zw' and Zw" represent a vertical speed and a vertical acceleration of the wheel 12, respectively, and assume positive values when the wheel 12 moves upward in absolute space.

A force fsrp is a resultant force (fs+ΔMr+ΔMp) formed of a spring force fs of the stabilizer that vertically acts on the vehicle body 11 due to roll movements of the vehicle body 11 resulting from disturbance from the road surface, a change ΔMr in road holding load that vertically acts on the vehicle body 11 due to roll movements of the vehicle body 11 when the vehicle turns, and a change ΔMp in road holding load that vertically acts on the vehicle body 11 due to pitch movements of the vehicle body 11 when the vehicle is accelerated or decelerated. The spring force fs of the stabilizer, the change ΔMr in road holding load and the change ΔMp in road holding load are expressed respectively by equations (1) through (3) shown below.

$$fs = Ks \times (Zw - Zb) \tag{1}$$

$$\Delta Mr = 2 \times Mb \times Gy \times H/T \tag{2}$$

$$\Delta Mp = 2 \times Mb \times Gx \times H/W \tag{3}$$

Ks represents a spring constant of the stabilizer, Mb a mass of the vehicle body 11, Gy a lateral acceleration of the vehicle, H a height of the center of gravity of the vehicle body 11, T a tread of the vehicle, Gx a longitudinal acceleration of the vehicle, and W a wheel base of the vehicle. The vertical motion of the vehicle body 11 is expressed by equation (4) shown below.

$$M \cdot Zb'' = K \times (Zw-Zb) + fd(Zw'-Zb', P) + fsrp = K \times (Zw-Zb) + fd(Zw'-Zb', P) + (fs + \Delta Mr + \Delta Mp) \quad (4)$$

Figure 1B:
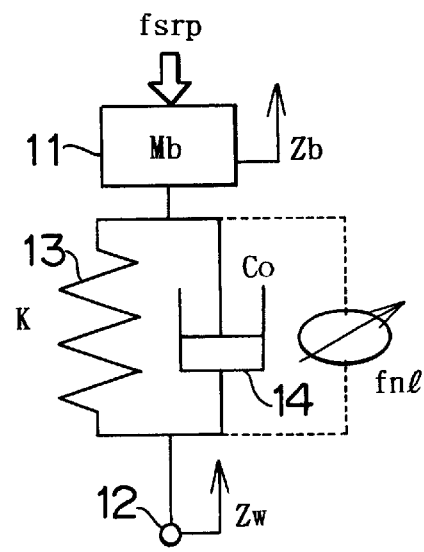
FIG. 1B is a model view with one degree of freedom wherein the model of a damper shown in FIG. 1A is illustrated with its linear and non-linear components.
Figure 2:
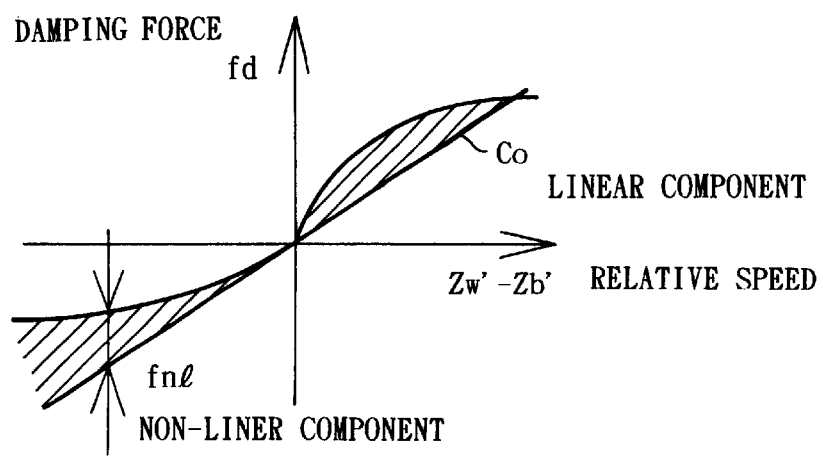
FIG. 2 is a graph generally showing a damping force characteristic of a damper.
Figure 3:
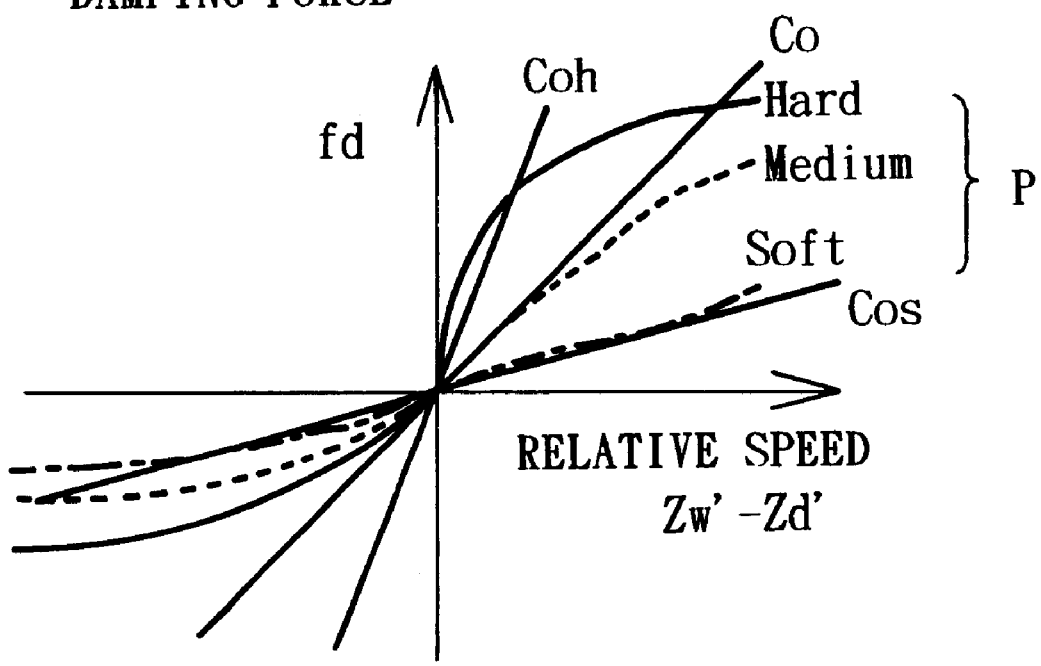
FIG. 3 is a graph showing damping force characteristics of a soft damper, a medium damper and a hard damper.

However, even though the relative speed (Zw'−Zb') and the opening position P as a control input are bilinear and the opening position P is fixed, since the damping force fd(Zw'−Zb', P) in the aforementioned equation (4) is designed to have a non-linear characteristic as shown in FIG. 2, the damping force fd(Zw'−Zb', P) cannot be applied directly to a linear Kalman filter (which functions as an observer). Thus, according to the present invention, the damping force fd(Zw'−Zb', P) is divided into a linear component Co·(Zw'−Zb') and a non-linear component fnl(Zw'−Zb', P) as indicated by equation (5) shown below, so that the non-linear component has a limited influence (FIGS. 1B and 3). Co is a damping coefficient that has been determined accurately.

$$fd(Zw'-Zb', P) = Co \times (Zw'-Zb') + fnl(Zw'-Zb', P) \quad (5)$$

Here, state variables x1 and x2 are set to (Zw'−Zb') and (Zw−Zb), respectively, and a state equation expressed by equation (6) shown below is derived from the aforementioned equations (4) and (5).

$$X' = AX + Gw + Bfnl(Zw'-Zb', P) = AX + Gw + Bx\{fd(Zw'-Zb', P) - Co \times (Zw'-Zb') + fs + \Delta Mr + \Delta Mp\} \quad (6)$$

In the aforementioned equation (6), X' represents a differential value of X, and X, A, G and B are expressed respectively by equations (7) through (10) shown below. The value w is defined as disturbance of the system and is equal to the vertical acceleration Zw" of the wheel 12.

$$X = \begin{bmatrix} x1 \\ x2 \end{bmatrix} = \begin{bmatrix} Zw' - Zb' \\ Zw - Zb \end{bmatrix} \quad (7)$$

$$A = \begin{bmatrix} a11 & a12 \\ a21 & a22 \end{bmatrix} = \begin{bmatrix} -Co/M_b & -K/M_b \\ 1 & 0 \end{bmatrix} \quad (8)$$

$$G = \begin{bmatrix} 1 \\ 0 \end{bmatrix} \quad (9)$$

$$B = \begin{bmatrix} b1 \\ b2 \end{bmatrix} = \begin{bmatrix} -1/Mb \\ 0 \end{bmatrix} \quad (10)$$

On the other hand, the relative speed (Zw'−Zb') and the amount of relative displacement (Zw−Zb), which are to be estimated, are defined as y1 and y2, respectively, and the vertical acceleration Zb" of the vehicle body 11 relative to absolute space, which is an observed value, is defined as y3. Then an output equation (11) shown below is established.

$$Y = \begin{bmatrix} y1 \\ y2 \\ y3 \end{bmatrix} = \begin{bmatrix} C1 \\ C2 \\ U \end{bmatrix} X + v + \begin{bmatrix} D1 \\ D2 \\ F \end{bmatrix} fnl(Zw' - Zb', P) \quad (11)$$

In the aforementioned equation (11), C1, C2, U, D1, D2 and F are expressed, respectively, by equations (12) through (17) shown below, and v represents observed noise of the vertical acceleration.

$$C1 = [c11 c12] = [1\ 0] \quad (12)$$

$$C2 = [c21 c22] = [0\ 1] \quad (13)$$

$$U = [u1 u2] = [C0/Mb\ K/Mb] \quad (14)$$

$$D1 = 0 \quad (15)$$

$$D2 = 0 \quad (16)$$

$$F = 1/Mb \quad (17)$$

The non-linear component fnl(Zw'−Zb', P) is regarded as an input variable u of an observer, and a Kalman filter theory is applied to a state space expression of a plant which is expressed by the aforementioned state equation (6) and the aforementioned output equation (11) so as to constitute an observer for estimating the relative speed y1 (=Zw'−Zb') and the amount y2(=Zw−Zb) of relative displacement. The observer is expressed by equations (8) through (21) shown below. In these equations, uob, Zwob' and Zbob' represent estimated values of the input variable u, the vertical acceleration Zw' of the wheel 12 and the vertical speed Zb' of the vehicle body 11, respectively.

$$uob = fnl(Zwob'-Zbob', P) = fd(Zw'-Zb', P) - Co \cdot (Zw'-Zb') + fs + \Delta Mr + \Delta Mp \quad (18)$$

$$Xob' = AXob + Buob + H[Zb'' - (UXob + Duob)] \quad (19)$$

$$y1 = C1 Xob \quad (20)$$

$$y2 = C2 Xob \quad (21)$$

In the aforementioned equation (19), H represents a constant Kalman gain, which is obtained as a value expressed by equation (23) shown below from a positive definite solution of Ricatti's equation expressed by equation (22) shown below, for a weight Q regarding a covariance of the disturbance w (=Zw") of the system and for a weight R regarding a covariance of the observed noise v in the equation (11).

$$AP + PA^T - PU^T R^{-1} UP + Q = 0 \quad (22)$$

$$H = PU^T R^{-1} \quad (23)$$

In the aforementioned equations (22) and (23), T represents a transposed matrix.

Next the constant Kalman gain H(h1, h2) will be described. By comparing the state equations (6) and (19), it is to be understood that this observer (Kalman filter) is a feedback-type estimator that combines prediction of a state (the first and second terms in the aforementioned equation (19)) based on the model of an object to be controlled with a corrective action (the third term in the aforementioned equation (19)) using a difference between an output observed by a sensor and an output estimated based on the model. Estimating precision of the observer can be demonstrated on the basis of an error equation (24) shown below, in which a difference between a true value X of the state variable and an estimated value Xob of the state variable is defined as E=X−Xob. E', X' and Xob' are differential values of E, X and Xob respectively.

$$E' = X' - Xob' = (A - HU)(X - Xob) + (B - HF)(u - uob) + (Gw - Hv) = (A - HU)E + (B - HF)(u - uob) + (Gw - Hv) \quad (24)$$

In the case where an ordinary observer (Kalman filter) is used for random disturbance (w, v) with a known spectrum, it is guaranteed that the error E=X−Xob assumes an unbiased minimum variance. However, in the case of the present estimator, since the term of disturbance includes (u−uob), the estimating precision deteriorates in accordance with an increase in (u−uob). Because (u−uob) represents an estimation error of the non-linear component of the damping force, it is important to determine the damping coefficient Co of the linear component in equation (5) such that fnl(Zw'−Zb', P) in fd (Zw'−Zb', P), which is defined by the aforementioned equation (5), assumes a smallest possible value.

However, the damper 14 according to the present invention is designed to have a variable width for reason of control, and an attempt at approximation of the characteristics of all the opening positions P with the single damping coefficient Co tends to cause an increase in the non-linear component. In view of this, according to the present invention, linearly approximated optimal damping coefficients Coh and Cos are set for two opening positions (hard and soft) respectively. In this case, two Kalman gains Hh(hh1, hh2) and Hs(hs1, hs2) are determined such that the estimation error is minimized. As for the intermediate positions, determination is made through linear interpolation between the aforementioned damping coefficients Coh and Cos. If the opening position P of the damper 14 is set to one of the stages 1 through 16 ("1" corresponds to "soft" and "16" corresponds to "hard"), the Kalman gain H is expressed by a equation (25) shown below.

$$H = Hs + \frac{P-1}{15}(Hh - Hs) \qquad (25)$$

$$= \begin{bmatrix} h1 \\ h2 \end{bmatrix} = \begin{bmatrix} hs1 \\ hs2 \end{bmatrix} + \frac{P-1}{15}\begin{bmatrix} hh1 - hs1 \\ hh2 - hs2 \end{bmatrix}$$

Figure 4:
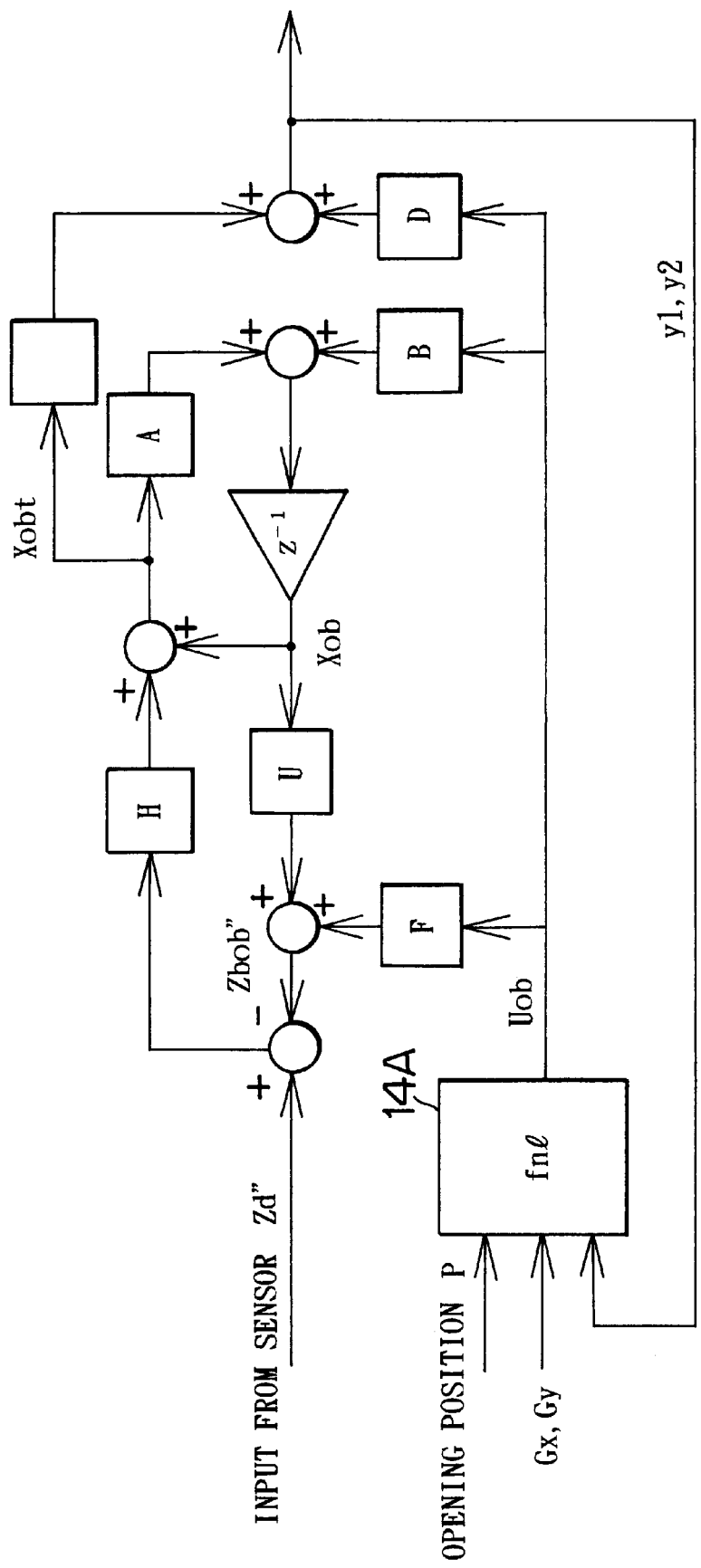
FIG. 4 is a block diagram of an observer according to one embodiment of the present invention.

FIG. 4 is a block diagram of the thus-constructed observer. A non-linear function generator 14A outputs the estimated input variable uob, which corresponds to the non-linear component fnl(Zwob'–Zbob', P) of a damping force of the damper 14. Another feature of the present invention consists in that the observer is stabilized (poles are confined to a stable zone) so as to surely converge calculation of an estimated relative speed y1ob and an estimated amount y2ob of relative displacement. Hence, in deriving the non-linear component fnl(Zw'–Zb', P)(the aforementioned equation (5)), a correction is made such that the gradient of a change characteristic of the damping force fd(Zw'–Zb', P) of the damper 14 that is utilized for the derivation becomes equal to or smaller than a predetermined value.

b. Specific Embodiment Applied to a Vehicle Suspension System

Next a description will be made of a specific embodiment of a control device wherein the aforementioned observer is used to estimate a relative speed (Zwob'–Zbob')(=y1ob) and an amount of displacement (Zwob–Zbob)(=y2ob) of the wheel 12 relative to the vehicle body 11 and wherein the estimated value y1ob is used to control a damping force of the damper 14 within a vehicle suspension system.

Figure 5:
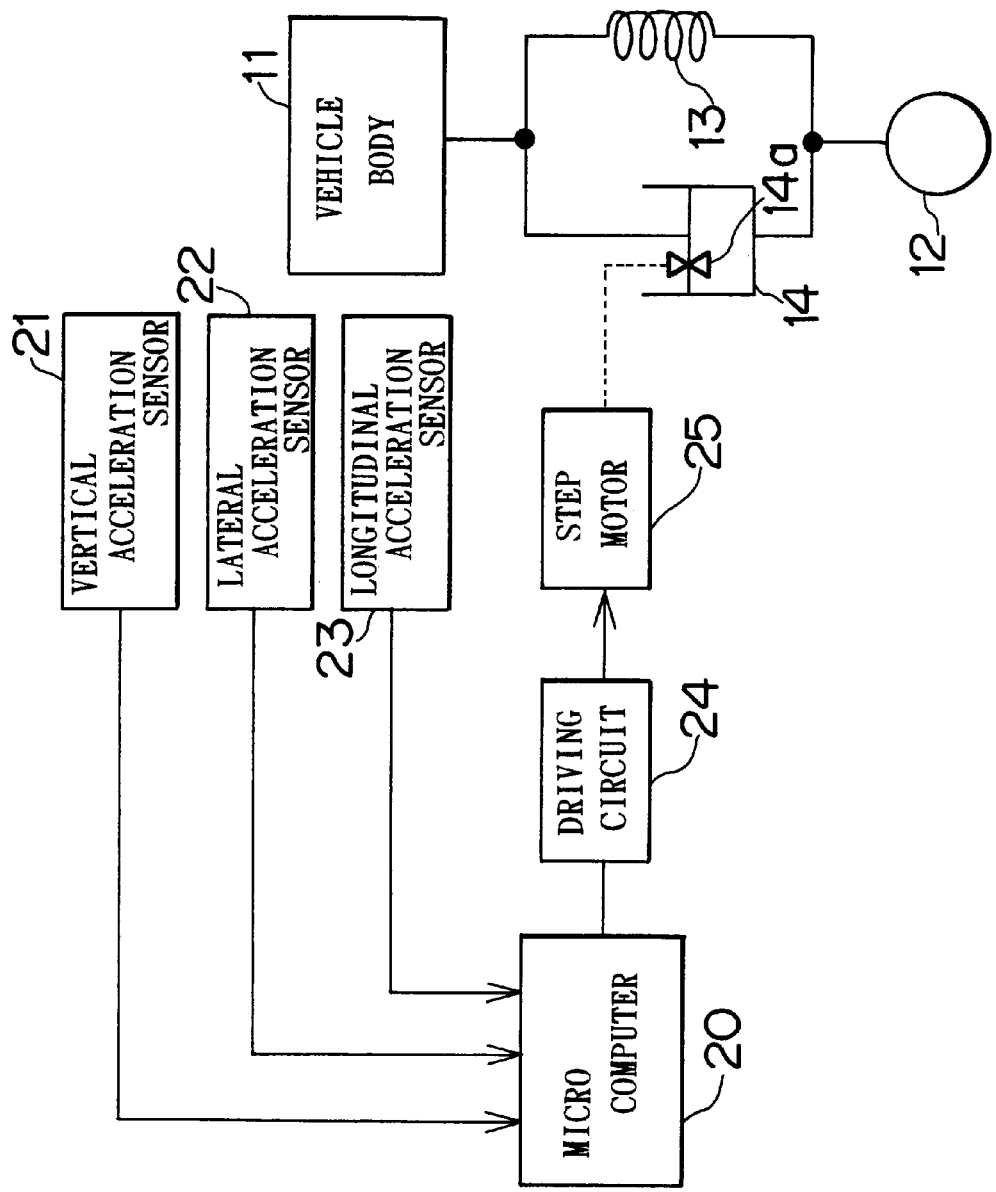
FIG. 5 is a block diagram of a suspension control device according to one embodiment of the present invention.

FIG. 5 is a block diagram of the control device, which is provided with a vertical acceleration sensor 21, a lateral acceleration sensor 22 and a longitudinal acceleration sensor 23. The vertical acceleration sensor 21 detects an acceleration of the vehicle body 11 in the vertical direction relative to absolute space as a vertical acceleration Zb" and outputs a detection signal indicative of the acceleration Zb". The lateral acceleration sensor 22 detects an acceleration of the vehicle body 11 in the lateral direction relative to absolute space as a lateral acceleration Gy and outputs a detection signal indicative of the acceleration Gy. The longitudinal acceleration sensor 23 detects an acceleration of the vehicle body 11 in the longitudinal direction relative to absolute space as a longitudinal acceleration Gx and outputs a detection signal indicative of the longitudinal acceleration Gx. These acceleration sensors 21 through 23 are connected to a microcomputer 20.

Figure 6:
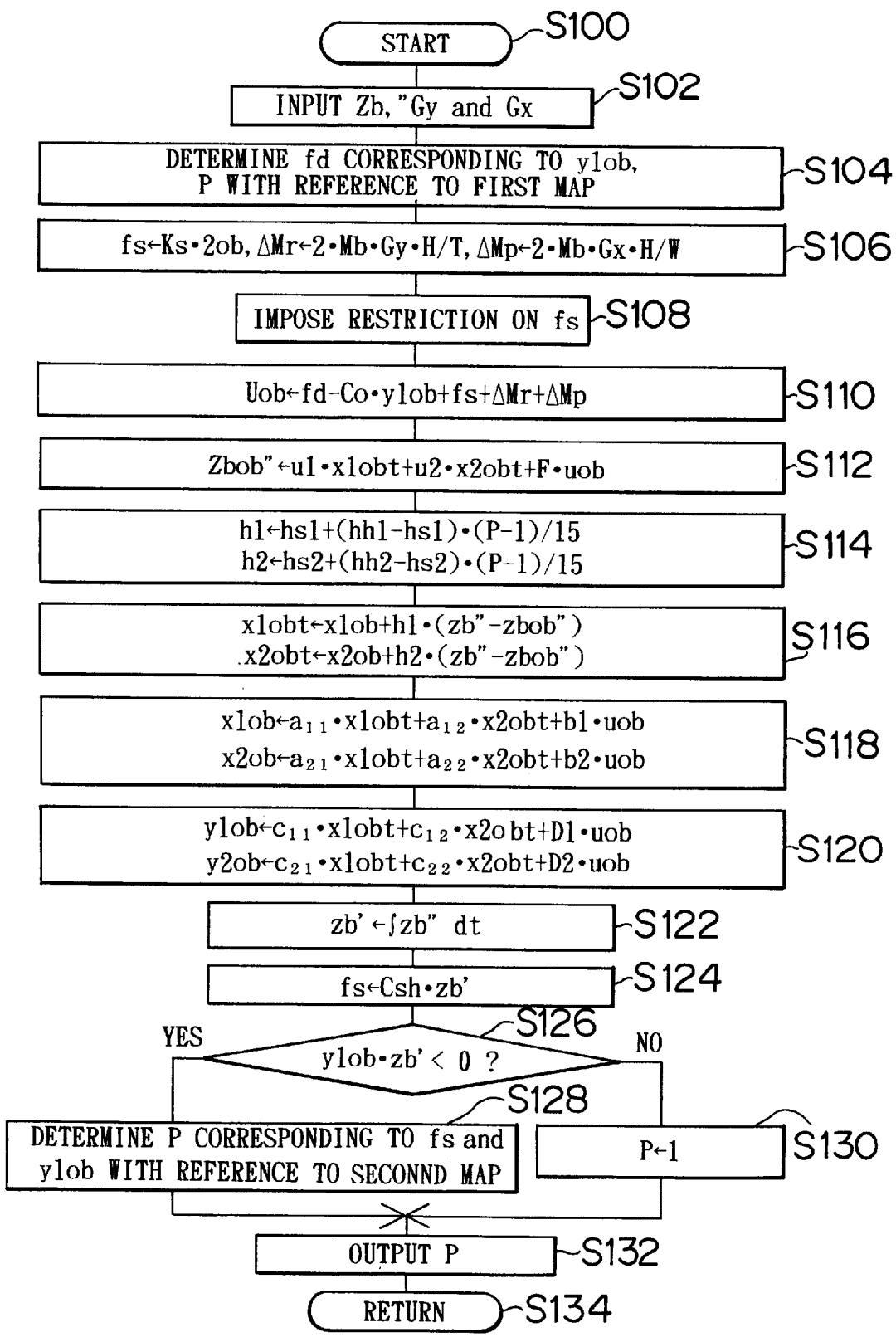
FIG. 6 is a flowchart of a program executed by a microcomputer shown in FIG. 5.
Figure 7:
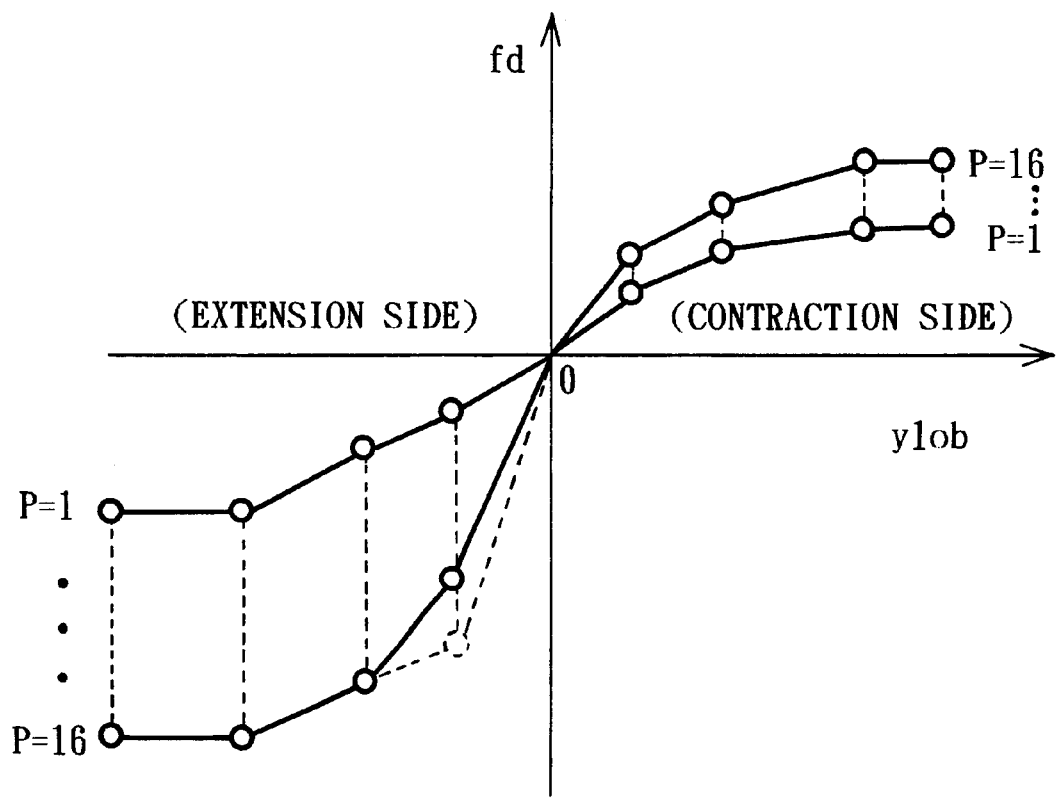
FIG. 7 is a graph showing damping force characteristics of a damper in a first map stored in the microcomputer shown in FIG. 5.
Figure 8:
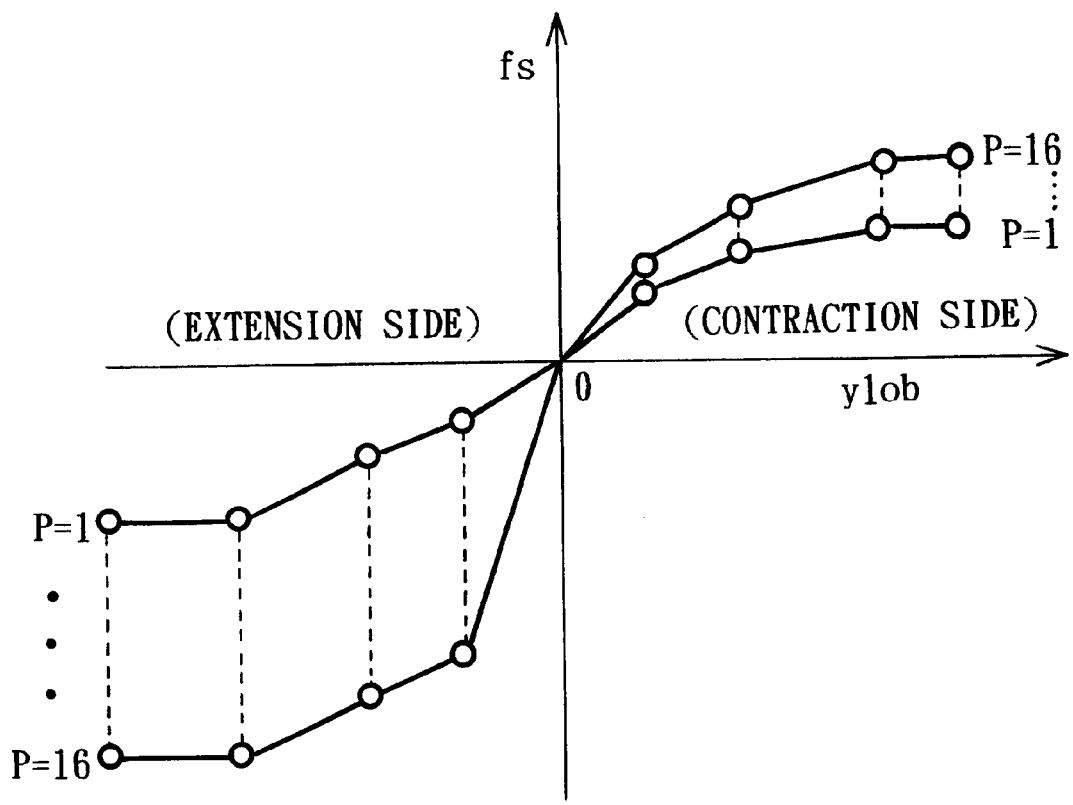
FIG. 8 is a graph showing damping force characteristics of a damper in a second map stored in the microcomputer shown in FIG. 5.

The microcomputer 20 repeatedly executes a program shown in FIG. 6 by means of a built-in timer at intervals of, e.g., 10 ms, thereby controlling a damping force of the damper 14. Also, first and second maps (first and second tables) are built into the microcomputer 20. As shown in FIGS. 7 and 8, these maps represent damping force characteristics of the damper 14 and memorize values of damping forces fd and fs corresponding to the relative speed y1ob for each of the opening positions P(=1 through 16) of the damper orifice. Referring to the first map in FIG. 7, as indicated by solid lines, the correction made herein is characterized in that the gradient of an intrinsic characteristic curve of the damper 14 is limited to a value equal to or smaller than a predetermined value. That is, in a zone wherein the relative speed y1ob is negative (on the side of extension of the damper 14) and the opening position P corresponds to a great opening area (on the hard side of the damper 14), the change curves, which intrinsically coincide with broken lines, are modified as indicated by the solid lines.

A driving circuit 24, which is connected to the microcomputer 20, controls a rotational speed of a step motor 25 in accordance with a control signal from the microcomputer 20 which indicates an opening position P corresponding to an opening degree of an orifice 14a of the damper 14. The step motor 25 is incorporated into the damper 14 and controls an opening degree of the orifice 14a through the aforementioned rotational speed control.

Next the operation of this specific embodiment will be described. Upon activation of a vehicular ignition switch (not shown), the microcomputer 20 performs program processing (not shown) to thereby set the opening position P to "1", control the step motor 25 through the driving circuit 24 and set the opening degree of the orifice 14a of the damper 14 to its maximum value (corresponding to the "soft" damper 14). After setting an estimated relative speed y1ob, an estimated amount y2ob of relative displacement, state variables Xob1 and Xob2 and intermediate parameters X1obt and X2obt to predetermined initial values, respectively, the microcomputer 20 repeatedly executes the program shown in FIG. 6 at intervals of 10 ms. It is to be noted that the opening position P, the estimated relative speed y1ob, the estimated amount y2ob of relative displacement, the state variables Xob1 and Xob2, the intermediate parameters X1obt and X2obt and various values used in a later-described program correspond to the respective values used for the description of the basic theory. However, since the observer is composed of a discrete system using concrete calculations, the values shown relate to the case where the aforementioned state equation and output equation are converted into a discrete system by means of bilinear transformation.

The aforementioned program is started in step S100. In step S102, the microcomputer 20 receives detection signals indicative of a vertical acceleration Zb", a lateral acceleration Gy and a longitudinal acceleration Gx from the vertical acceleration sensor 21, the lateral acceleration sensor 22 and the longitudinal acceleration sensor 23, respectively. Next in step S104, a damping force fd(y1ob, P) corresponding to the estimated relative speed y1ob and the opening position P is determined with reference to the first map (FIG. 7). In this case, although the estimated relative speed y1ob and the opening position P that have been initially set as described above are utilized in the first iteration, values derived from the last iterations of steps S120, S128 and S130 are utilized in subsequent iterations of the FIG. 6 program. The damping force fd(y1ob, P) may be suitably calculated through linear interpolation that uses values read from the first map.

Next in step S106, by making calculations according to equations (26) through (28), which correspond to the aforementioned equations (1) through (3) respectively, a spring force fs of the stabilizer generated by roll movements of the vehicle body 11 resulting from a convex-concave (wavy) road surface, a change $\Delta Mr$ in road holding load generated by roll movements of the vehicle body 11 when the vehicle turns, and a change $\Delta Mp$ in road holding load generated by pitch movements of the vehicle body 11 when the vehicle is accelerated or decelerated are calculated respectively.

$$fs = Ks \times y2ob \quad (26)$$

$$\Delta Mr = 2 \times Mb \times Gy \times H/T \quad (27)$$

$$\Delta Mp = 2 \times Mb \times Gx \times H/W \quad (28)$$

In the aforementioned equation (26), Ks represents a spring constant of the stabilizer which is preliminarily given as a constant. However, this spring constant Ks can be adjusted for the purpose of calculating the estimated relative speed y1ob and the estimated amount y2ob of relative displacement with high precision and high stability. Although y2ob is an estimated amount of displacement that has been initially set as described above in the initial iteration, the value calculated in step S120 is utilized in the following iterations. In the aforementioned equations (27) and (28), Mb represents a mass of the vehicle body 11, H a height of the center of gravity of the vehicle body 11, T a tread of the vehicle, and W a wheel base of the vehicle. These values Mb, H, T and W are preliminarily given as constants. Gy and Gx represent, respectively, the lateral acceleration and longitudinal acceleration of the vehicle which have been input in the aforementioned iteration of step S102.

Figure 9:
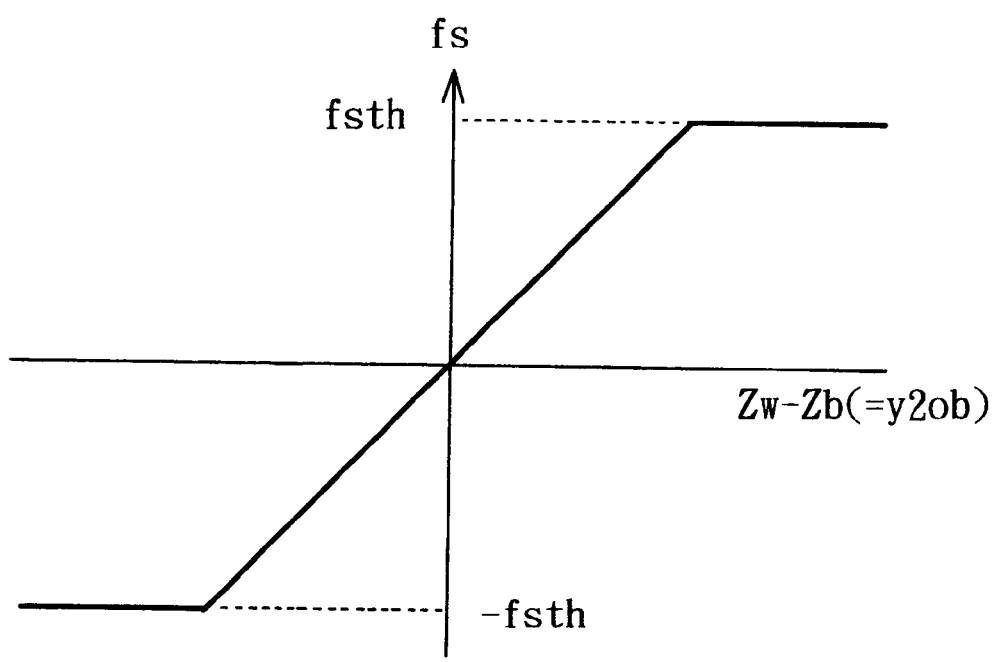
FIG. 9 is a graph showing a limiting characteristic of spring force of a stabilizer employed in the observer.

Next in step S108, the above-calculated spring force fs of the stabilizer is restricted such that an absolute value $|fs|$ thereof becomes equal to or smaller than a threshold value fsth (see FIG. 9). That is, the above-calculated spring force fs is compared with the threshold values fsth and −fsth. if fs<−fsth, fs is changed into −fsth. If −fsth $\leq$ fs $\leq$ fsth, fs remains equal to the above-calculated value. If fs>fsth, fs is changed into fsth.

After the aforementioned processing of step S108, by making a calculation according to equation (29) corresponding to the aforementioned equation (18), in step S110 an estimated input variable uob (=the non-linear component fnl (Zw'−Zb', P)) of the damper 14 is calculated using the above-calculated damping force fd(y1ob, P), the spring force fs, and the changes in road holding load $\Delta Mr$ and $\Delta Mp$. Also in this case, Co is a damping coefficient of the damper 14 which has been determined accurately as described above (FIG. 3), and the estimated relative speed y1ob is the value utilized in the aforementioned step S104.

$$uob = fd(y1ob, P) - Co \times y1ob + fs + \Delta Mr + \Delta Mp \quad (29)$$

Next in step S112, an estimated vertical acceleration Zbob" of the vehicle body 11 is calculated by making a calculation according to equation (30) shown below, using the coefficients u1, u2 and F prescribed in the aforementioned equations (14) and (17) and the estimated input variable uob calculated in the aforementioned step S110. Also, as the intermediate parameters X1obt and X2obt in the equation (30), although the values that have been initially set as described above are utilized in the initial iteration, the values derived from the last iteration of step S116 are utilized in the subsequent iterations.

$$Zbob" = u1 \times X1obt + u2 \times X2obt + F \times uob \quad (30)$$

Next in step S114, by making calculations according to equations (31) and (32) corresponding to the aforementioned equation (25), gains h1 and h2 are calculated. Also in this case, the value utilized in the aforementioned step S104 is used as the opening position P.

$$h1 = hs1 + (hh1 - hs1) \times (P-1)/15 \quad (31)$$

$$h2 = hs2 + (bh2 - hs2) \times (P-1)/15 \quad (32)$$

Next in step S116, intermediate parameters X1obt and X2obt are calculated by making calculations according to equations (33) and (34), using the vertical acceleration Zb" input through the aforementioned iteration of step S102, the estimated vertical acceleration Zbob" calculated through the aforementioned iteration of step S112, and the gains h1 and h2 calculated through the aforementioned iteration of step S114. Also in this case, as for the state variables X1ob and X2ob, although the values that have been initially set as described above are utilized in the initial iteration, the values derived from the last iteration of step S118 are utilized in the subsequent iterations.

$$X1obt = X1ob + h1 \times (Zb" - Zbob") \quad (33)$$

$$X2obt = X2ob + h2 \times (Zb" - Zbob") \quad (34)$$

Next in step S118, state variables X1ob and X2ob are calculated by making calculations according to equations (35) and (36) using the intermediate parameters X1obt and X2obt and the estimated input variable uob calculated through the aforementioned iterations of steps S116 and S110, and the coefficients a11, a12, a21, a22, b1 and b2 prescribed in the aforementioned equations (8) and (10).

$$X1ob = a11 \times X1obt + a12 \times X2obt + b1 \times uob \quad (35)$$

$$X2ob = a21 \times X1obt + a22 \times X2obt + b2 \times uob \quad (36)$$

Next in step S120, an estimated relative speed y1ob and an estimated amount y2ob of relative displacement are calculated by making calculations according to equations (37) and (38) respectively, using the intermediate parameters X1obt and X2obt, the estimated input variable uob calculated through the aforementioned iterations of steps S116 and S110, and the coefficients c11, c12, c21, c22, D1 and D2 prescribed in the aforementioned equations (12), (13), (15) and (16). Thereby a speed (Zw'−Zb') of the wheel 12 relative to the vehicle body 11 and an amount (Zw−Zb) of displacement of the wheel 12 relative to the vehicle body 11 are estimated.

$$y1ob = c11 \times X1obt + c12 \times X2obt + D1 \times uob \quad (37)$$

$$y2ob = c21 \times X1obt + c22 \times X2obt + D2 \times uob \quad (38)$$

Next, it will be described how to control a damping force of the damper 14 according to the skyhook theory based on the thus-estimated relative speed y1ob and the detected vertical acceleration Zb". First, in step S122, the vertical acceleration Zb" input as described above is time-integrated according to equation (39), whereby a vertical speed Zb' of the vehicle body 11 is calculated. In step S124, by making a calculation according to equation (40), a skyhook damping force fs of the damper 14 is calculated using a skyhook damping coefficient Csh. The skyhook damping coefficient Csh is preliminarily given as a constant.

$$Zb' = \int Zb" dt \quad (39)$$

$$fs = Csh \times Zb' \quad (40)$$

It is then determined in step S126 whether or not the estimated relative speed y1ob and the vertical speed Zb' have different signs, that is, whether an oscillating state of the vehicle body 11 is in an exciting zone or in a damping zone. If the oscillating state of the vehicle body 11 is in the damping zone and the estimated relative speed y1ob and the vertical speed Zb' have different signs, the result is judged to be "YES" in step S126. The second map (FIG. 8) is then referred to in step S128, whereby an opening position P corresponding to the above-calculated skyhook damping force fs and the estimated relative speed y1ob is determined. In making this determination, a curve which is located closest to a point determined by the skyhook damping force fs and the estimated relative speed y1ob is retrieved in the graph shown in FIG. 8, and the opening position P corresponding to the retrieved curve is selected. On the other hand, if the oscillating state of the vehicle body 11 is in the exciting zone and the estimated relative speed y1ob and the vertical speed Zb' have the same signs, the result is judged to be "NO" in step S126. In step S130, an opening position P is then set to "1", which indicates the softest state of the damper 14.

After the aforementioned iterations of steps S128 and S130, a control signal indicative of the opening position P is output to the driving circuit 24 in step S132. The driving circuit 24 controls rotation of the step motor 25 based on the control signal, and adjusts an opening degree of the orifice 14a of the damper 14 to a value corresponding to the aforementioned opening position P. As a result, the damping force of the damper 14 is controlled based on the skyhook theory, which brings about an improvement in riding comfort of the vehicle. The program ends in step S134.

In the embodiment constructed as described above, the iterations of steps S102 through S120 of the program executed by the microcomputer 20 constitute an observer (estimation means or estimator). According to this observer, a vertical speed (Zw'−Zb') and an amount (Zw−Zb) of displacement of the vehicle body 11 relative to the wheel 12 (a vertical speed (Zb'−Zw') and an amount (Zb−Zw) of displacement of the wheel 12 relative to the vehicle body 11) are estimated respectively, using as an observed value a vertical acceleration Zb" of the vehicle body 11 relative to absolute space, which has been detected by the vertical acceleration sensor 21. Therefore the number of sensors can be reduced. In particular, through the iterations in steps S106 and S110, a spring force fs of the stabilizer generated by roll movements of the vehicle body 11 resulting from a convex-concave road surface, a change ΔMr in road holding load generated by roll movements of the vehicle body 11 when the vehicle turns, and a change ΔMp in road holding load generated by pitch movements of the vehicle body 11 when the vehicle is accelerated or decelerated are calculated. The non-linear component of the damper 14, whose control inputs are the spring force fs and the changes ΔMr and ΔMp in road holding load, is compensated for. Therefore, even when the vehicle makes roll movements of the vehicle body 11 due to the disturbance from a road surface, or when the vehicle body 11 makes roll movements when turning, or when the vehicle body 11 makes pitch movements during acceleration or deceleration, the relative speed (Zw'−Zb') and the amount (Zw−Zb) of relative displacement are determined precisely.

Through the processing in step S108, the above-calculated spring force fs is confined to a predetermined range. Therefore the spring force fs is prevented from becoming unsuitably great due to an error, and the value estimated by the observer does not oscillate. Hence, a kinetic state quantity of the vehicle body 11 relative to the wheel 12 is estimated with high stability.

In the aforementioned embodiment, the vertical acceleration Zb", which serves as an absolute vertical kinetic state quantity of the vehicle body 11, is adopted as an observed value. However, the vertical speed Zb' and the amount Zb of displacement of the vehicle body 11 relative to absolute space can be calculated by integrating the aforementioned vertical acceleration Zb". The vertical acceleration Zb" can also be calculated by differentiating the speed Zb' and the amount Zb of displacement. In other words, the vertical acceleration Zb", the speed Zb' and the amount Zb of displacement are equivalent kinetic state quantities. Accordingly, the vertical speed and the vertical amount of displacement of the vehicle body 11 relative to absolute space may be adopted as an absolute vertical kinetic state quantity of the vehicle body 11. Further, according to the aforementioned embodiment, the vertical speed (Zb'−Zw') of the vehicle body 11 relative to the wheel 12 and the vertical amount (Zb−Zw) of displacement of the vehicle body 11 relative to the wheel 12 are estimated as kinetic state quantities of the vehicle body 11 relative to the wheel 12. However, the vertical acceleration (Zb"−Zw") of the vehicle body 11 relative to the wheel 12 can also be calculated by differentiating the aforementioned relative speed (Zb'−Zw'), and the aforementioned relative speed (Zb'−Zw') can also be calculated by integrating the relative acceleration (Zb"−Zw"). In other words, the relative acceleration (Zb"−Zw"), the relative speed (Zb'−Zw') and the amount (Zb−Zw) of relative displacement are also equivalent kinetic state quantities. Accordingly, the vertical acceleration (Zb"−Zw') of the vehicle body 11 relative to the wheel 12 may also be adopted as a vertical kinetic state quantity of the vehicle body 11 relative to the wheel 12.

In the aforementioned embodiment, a spring force fs of the stabilizer generated by roll movements of the vehicle body 11 resulting from a convex-concave road surface, a change ΔMr in road holding load generated by roll movements of the vehicle body 11 when the vehicle turns, and a change ΔMp in road holding load generated by pitch movements of the vehicle body 11 when the vehicle is accelerated or decelerated are used to compensate for a control input of the observer (the non-linear component of the damper 14). However, for reasons of an influence exerted by the observer on the estimated value, calculating speed and the like, one or more of the spring force fs and the changes ΔMr and ΔMp may be dispensed with when making the calculation for compensation.

In the aforementioned embodiment, the first map shown in FIG. 7 is used to derive the damping force fd of the damper 14 in step S104 of FIG. 6. However, in this case, what needs to be done is to derive the damping force fd of the damper 14 from the estimated relative speed y1ob and the opening position P. Therefore, instead of using the first map, the aforementioned damping force fd may be derived through calculations using the estimated relative speed y1ob, the opening position P and predetermined parameters. In other words, in order to derive the damping force fd of the damper 14, various non-linear function generating means including the first map, calculation and the like can be used. However, also in this case, the gradient of the curve indicative of a change in damping force fd with respect to the estimated relative speed y1ob is limited to a value equal to or smaller than a predetermined value.

In the aforementioned embodiment, the second map (FIG. 8) is used to determine the opening position P in step S128 of FIG. 6. The second map is different from the first map only in a zone wherein the estimated relative speed y1ob assumes a negative value and the opening position P corresponds to a great opening area. Hence, if a slight error is permitted, it is possible to use the first map (FIG. 7) to determine the opening position P in step S128 instead of using the second map.

The observer and compensators can be implemented as a programmed general purpose computer (i.e., the microcomputer 20). It will be appreciated by those skilled in the art that the observer and compensators can be implemented using a single special purpose integrated circuit (e.g., ASIC) having a main or central processor section for overall, system-level control, and separate sections dedicated to performing various different specific computations, functions and other processes under control of the central processor section. The observer and compensators also can be a plurality of separate dedicated or programmable integrated or other electronic circuits or devices (e.g., hardwired electronic or logic circuits such as discrete element circuits, or programmable logic devices such as PLDs, PLAs, PALs or the like). The observer and compensators can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the processes described herein and/or shown in FIG. 6 can be used as the observer and compensators. A distributed processing architecture can be used for maximum data/signal processing capability and speed.

While the present invention has been described with reference to a preferred embodiment thereof, it is to be understood that the present invention is not limited to the disclosed embodiment or construction. On the contrary, the present invention is intended to cover various modifications and equivalent arrangements. In addition, while the various elements of the disclosed invention are shown in various combinations and configurations which are exemplary, other combinations and configurations, including more, less or only a single element, are also within the spirit and scope of the present invention.

What is claimed is:

1. A kinetic state quantity estimating device for use with a vehicle having a damper that generates a damping force corresponding to an orifice opening degree of a damper orifice, the kinetic state quantity estimating device estimating a vertical kinetic state quantity of a sprung member relative to an unsprung member, and comprising:

an absolute kinetic state quantity detector that detects a vertical kinetic state quantity of the sprung member relative to absolute space;

an observer that estimates the vertical kinetic state quantity of the sprung member relative to the unsprung member based upon the vertical kinetic state quantity detected by the absolute kinetic state quantity detector and a non-linear component of the damping force of the damper determined by the orifice opening degree as a control input; and a first compensator that determines a spring force of a stabilizer based on an amount of relative displacement of the sprung member relative to the unsprung member, and compensates for the control input of the observer based upon the determined spring force.

2. The kinetic state quantity estimating device according to claim 1, wherein the first compensator confines the spring force of the stabilizer to within a predetermined range.

3. The kinetic state quantity estimating device according to claim 2, further comprising:

a lateral acceleration detector that detects a lateral acceleration of the vehicle; and a second compensator that determines a change in road holding load generated by roll movements of the sprung member based on the lateral acceleration detected by the lateral acceleration detector and that compensates for the control input of the observer based upon the determined change in road holding load.

4. The kinetic state quantity estimating device according to claim 2, further comprising:

a longitudinal acceleration detector that detects a longitudinal acceleration of the vehicle; and a second compensator that determines a change in road holding load generated by pitch movements of the sprung member based on the longitudinal acceleration detected by the longitudinal acceleration detector and that compensates for the control input of the observer based upon the determined change in road holding load.

5. The kinetic state quantity estimating device according to claim 1, further comprising:

a lateral acceleration detector that detects a lateral acceleration of the vehicle; and a second compensator that determines a change in road holding load generated by roll movements of the sprung member based on the lateral acceleration detected by the lateral acceleration detector and that compensates for the control input of the observer based upon the determined change in road holding load.

6. The kinetic state quantity estimating device according to claim 1, further comprising:

a longitudinal acceleration detector that detects a longitudinal acceleration of the vehicle; and a second compensator that determines a change in road holding load generated by pitch movements of the sprung member based on the longitudinal acceleration detected by the longitudinal acceleration detector and that compensates for the control input of the observer based upon the determined change in road holding load.

7. A kinetic state quantity estimating device for use with a vehicle having a damper that generates a damping force corresponding to an orifice opening degree of a damper orifice, the kinetic state quantity estimating device estimating a vertical kinetic state quantity of a sprung member relative to an unsprung member, and comprising:

an absolute kinetic state quantity detector that detects a vertical kinetic state quantity of the sprung member relative to absolute space;

an observer that estimates the vertical kinetic state quantity of the sprung member relative to the unsprung member based upon the vertical kinetic state quantity detected by the absolute kinetic state quantity detector and a non-linear component of the damping force of the damper determined by the orifice opening degree as a control input;

a lateral acceleration detector that detects a lateral acceleration of the vehicle; and a compensator that determines a change in road holding load generated by roll movements of the sprung member based on the lateral acceleration detected by the lateral acceleration detector, and that compensates for the control input of the observer based upon the determined change in road holding load.

8. A kinetic state quantity estimating device for use with a vehicle having a damper that generates a damping force corresponding to an orifice opening degree of a damper orifice, the kinetic state quantity estimating device estimating a vertical kinetic state quantity of a sprung member relative to an unsprung member, and comprising:

an absolute kinetic state quantity detector that detects a vertical kinetic state quantity of the sprung member relative to absolute space;

an observer that estimates the vertical kinetic state quantity of the sprung member relative to the unsprung member based upon the vertical kinetic state quantity detected by the absolute kinetic state quantity detector and a non-linear component of the damping force of the damper determined by the orifice opening degree as a control input;

a longitudinal acceleration detector that detects a longitudinal acceleration of the vehicle; and a compensator that determines a change in road holding load generated by pitch movements of the sprung member based on the longitudinal acceleration detected by the longitudinal acceleration detector, and that compensates for the control input of the observer based upon the determined change in road holding load.

9. A kinetic state quantity estimating method for use with a vehicle having a damper that generates a damping force corresponding to an orifice opening degree of a damper orifice, the method comprising:

detecting a vertical kinetic state quantity of the sprung member relative to absolute space;

estimating a vertical kinetic state quantity of the sprung member relative to the unsprung member based upon the detected vertical kinetic state quantity of the sprung member relative to absolute space and a non-linear component of the damping force of the damper determined by the orifice opening degree as a control input; and determining a spring force of a stabilizer based on an amount of displacement of the sprung member relative to the unsprung member, and compensating for the control input based upon the determined spring force.

10. The method according to claim 9, wherein the spring force of the stabilizer is confined to within a predetermined range.

11. The method according to claim 10, further comprising:

detecting a lateral acceleration of the vehicle; and determining a change in road holding load generated by roll movements of the sprung member based on the detected lateral acceleration and compensating for the control input based upon the determined change in road holding load.

12. The method according to claim 10, further comprising:

detecting a longitudinal acceleration of the vehicle; and determining a change in road holding load generated by pitch movements of the sprung member based on the detected longitudinal acceleration and compensating for the control input based upon the determined change in road holding load.

13. The method according to claim 9, further comprising:

detecting a lateral acceleration of the vehicle; and determining a change in road holding load generated by roll movements of the sprung member based on the detected lateral acceleration and compensating for the control input based upon the determined change in road holding load.

14. The method according to claim 9, further comprising:

detecting a longitudinal acceleration of the vehicle; and determining a change in road holding load generated by pitch movements of the sprung member based on the detected longitudinal acceleration and compensating for the control input based upon the determined change in road holding load.

15. A kinetic state quantity estimating method for use with a vehicle having a damper that generates a damping force corresponding to an orifice opening degree of a damper orifice, the method comprising:

detecting a vertical kinetic state quantity of the sprung member relative to absolute space;

estimating a vertical kinetic state quantity of the sprung member relative to the unsprung member based upon the detected vertical kinetic state quantity of the sprung member relative to absolute space and a non-linear component of the damping force of the damper determined by the orifice opening degree as a control input;

detecting a lateral acceleration of the vehicle; and determining a change in road holding load generated by roll movements of the sprung member based on the detected lateral acceleration, and compensating for the control input based upon the determined change in road holding load.

16. A kinetic state quantity estimating method for use with a vehicle having a damper that generates a damping force corresponding to an orifice opening degree of a damper orifice, the method comprising:

detecting a vertical kinetic state quantity of the sprung member relative to absolute space;

estimating a vertical kinetic state quantity of the sprung member relative to the unsprung member based upon the detected vertical kinetic state quantity of the sprung member relative to absolute space and a non-linear component of the damping force of the damper determined by the orifice opening degree as a control input;

detecting a longitudinal acceleration of the vehicle; and determining a change in road holding load generated by pitch movements of the sprung member based on the detected longitudinal acceleration, and compensating for the control input based upon the determined change in road holding load.

* * * * *